W. S. FRANKLIN.
METHOD OF RAISING AND PURIFYING WATER.
APPLICATION FILED JAN. 19, 1912.
1,124,600. Patented Jan. 12, 1915.
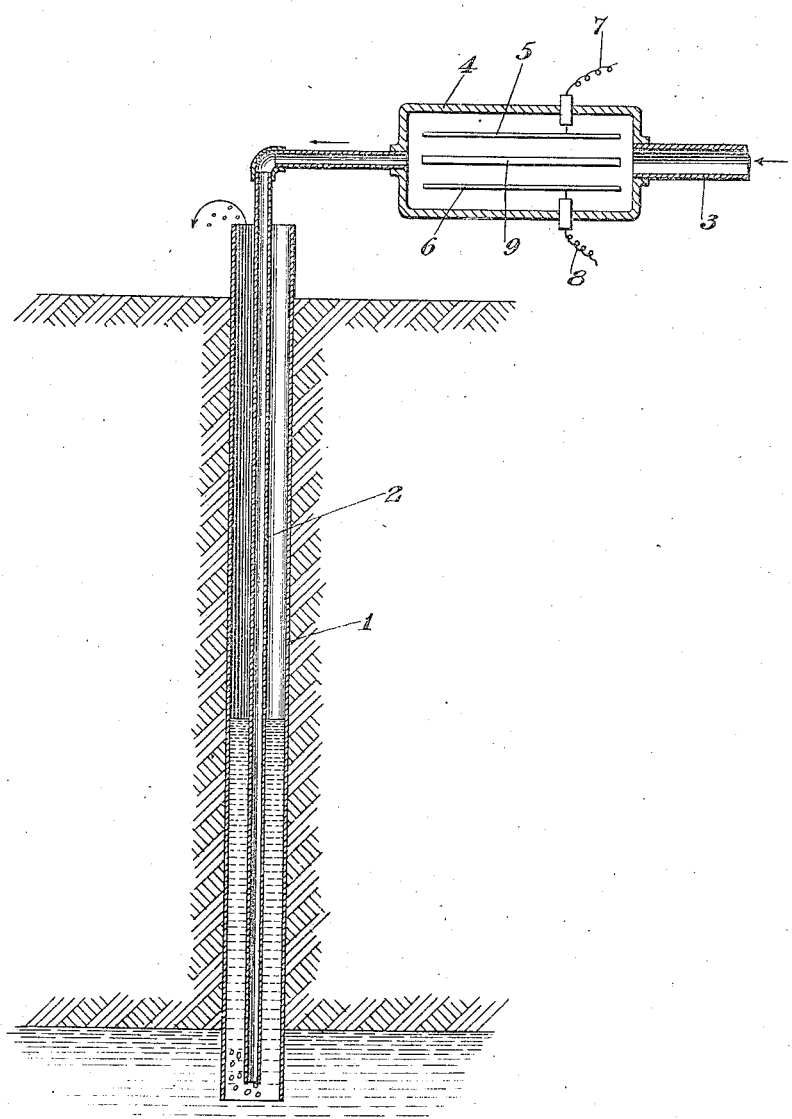

UNITED STATES PATENT OFFICE.

WILLIAM S. FRANKLIN, OF SOUTH BETHLEHEM, PENNSYLVANIA.

METHOD OF RAISING AND PURIFYING WATER.

1,124,600.  Specification of Letters Patent.  Patented Jan. 12, 1915.

Application filed January 19, 1912. Serial No. 672,174.

*To all whom it may concern:*

Be it known that I, WILLIAM S. FRANKLIN, of South Bethlehem, in the county of Northampton and in the State of Pennsylvania, have invented a certain new and useful Improvement in Methods of Raising and Purifying Water, and do hereby declare that the following is a full, clear, and exact description thereof.

The object of my invention has been to provide a method of purifying water, and particularly one adapted for simultaneously raising and purifying water, and to such ends my invention consists in the apparatus for and method of purifying and raising water hereinafter specified.

While my method may be used for purifying water without raising it, the primary use for which my invention is intended is that of simultaneously raising and purifying water.

More particularly, my invention is intended for raising water out of wells and for purifying the water while it is being raised.

While I shall illustrate my invention by the best embodiment known to me, such embodiment is to be regarded as typical only of many possible embodiments, and my claim is, therefore, not to be restricted to the particular embodiment shown.

In the accompanying drawing:—The figure is a diagrammatic view of an apparatus, which is one embodiment of my invention.

In the accompanying drawing, a well has been formed by sinking a pipe 1 from the surface of the ground to a water-bearing strata. It is desired to raise water from this well, and at the same time to purify it, preferably by ozonizing it. I accordingly provide an air pipe 2, which extends to a point near the bottom of the pipe 1 so as to introduce air bubbles into the water and cause the water to rise in the well-known way. This air pipe is connected by a pipe 3 with an air pump or other source of compressed air. An ozonizer, or other apparatus for introducing a purifying agent into the air, is connected at some point in the compressed air circuit. In the illustrated embodiment, the ozonizer is interposed between the pipes 2 and 3. The ozonizer is illustrated diagrammatically by a casing 4, in which are metal plates 5 and 6 which are connected by leads 7 and 8, respectively, with a source of high voltage alternating current, such as a transformer. A glass plate barrier 9 is interposed between the metal plates.

In the operation of my apparatus, according to my said method, air is forced through the ozonizer and is there ozonized and descends through the air pipe 2 to the lower end of the water pipe 1. The escaping air forms air bubbles in the water of the water pipe and causes it to rise in the well-known manner. During the travel of the air bubbles through the water, the ozone sterilizes the water. The apparatus thus not only sterilizes the water but at the same time raises it.

I claim:

The method of purifying water consisting in causing ozonized air to pass through and lift a body of water, the ozonized air being under a constantly decreasing pressure throughout the entire time of contact.

In testimony that I claim the foregoing I have hereunto set my hand.

WILLIAM S. FRANKLIN.

Witnesses:
 CONST. COLLINS,
 C. DANIEL FRIEBELY.